United States Patent
Kanda et al.

(10) Patent No.: US 11,766,836 B2
(45) Date of Patent: *Sep. 26, 2023

(54) METAL-RESIN COMPOSITE AND METHOD FOR PRODUCING SAME

(71) Applicant: DIC Corporation, Tokyo (JP)

(72) Inventors: Tomomichi Kanda, Ichihara (JP); Kenji Nakamura, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/282,861

(22) PCT Filed: Oct. 10, 2019

(86) PCT No.: PCT/JP2019/040025
§ 371 (c)(1),
(2) Date: Apr. 5, 2021

(87) PCT Pub. No.: WO2020/075804
PCT Pub. Date: Apr. 16, 2020

(65) Prior Publication Data
US 2021/0347130 A1    Nov. 11, 2021

(30) Foreign Application Priority Data

Oct. 12, 2018    (JP) ................ 2018-193651

(51) Int. Cl.
B32B 15/08    (2006.01)
B29C 65/00    (2006.01)
B29C 65/06    (2006.01)

(52) U.S. Cl.
CPC ............ *B29C 66/742* (2013.01); *B29C 65/06* (2013.01); *B29C 66/7392* (2013.01);
(Continued)

(58) Field of Classification Search
None
See application file for complete search history.

(56) References Cited

U.S. PATENT DOCUMENTS

| 2007/0044406 A1 | 3/2007 | Van Aken et al. |
| 2016/0325488 A1 | 11/2016 | Tanaka et al. |
| 2019/0077089 A1* | 3/2019 | Nishiguchi ........... B29C 66/742 |

FOREIGN PATENT DOCUMENTS

| JP | 2010-076437 A | 4/2010 |
| JP | 2010-158885 A | 7/2010 |

(Continued)

OTHER PUBLICATIONS

Van Krevelen et al., "Properties of Polymers" (Chapter 24, "Processing Properties"), 2009, Elsevier Technology & Engineering, Fourth Edition, p. 799-818. (Year: 2009).*

*Primary Examiner* — Humera N. Sheikh
*Assistant Examiner* — Kim S. Horger
(74) *Attorney, Agent, or Firm* — Locke Lord LLP

(57) ABSTRACT

There is provided a method for producing a metal-resin composite including a metal member and a resin member which are joined together, the resin member containing at least a thermoplastic resin. The method includes a step of joining together the resin member and the metal member by melting the resin member with the frictional heat generated in the surface of the metal member on its side opposite to the resin member in a state where the metal member and the resin member are superposed. The melting point of the thermoplastic resin is 260° C. or more.

13 Claims, 2 Drawing Sheets

(52) U.S. Cl.
CPC .. *B29C 66/73115* (2013.01); *B29C 66/73121* (2013.01); *B32B 15/08* (2013.01)

(56) References Cited

FOREIGN PATENT DOCUMENTS

| | | | |
|---|---|---|---|
| JP | 2011-224974 A | 11/2011 | |
| JP | 2012-066287 A | 4/2012 | |
| JP | 2014-180776 A | 9/2014 | |
| JP | 2015-131443 A | 7/2015 | |
| JP | 2017-013084 A | 1/2017 | |
| JP | 2017-104885 A | 6/2017 | |
| JP | 2017-170692 A | 9/2017 | |
| JP | 2017177464 A * | 10/2017 | |
| JP | 2018-144297 A | 9/2018 | |
| KR | 10-2015-0134384 A | 12/2015 | |
| WO | 2014/157289 A1 | 10/2014 | |
| WO | WO-2017170445 A1 * | 10/2017 | ........... B23K 20/122 |

* cited by examiner

METAL-RESIN COMPOSITE AND METHOD FOR PRODUCING SAME

CROSS REFERENCE TO RELATED APPLICATIONS

This application is related to co-pending application: "METAL-RESIN COMPOSITE AND METHOD FOR PRODUCING SAME" filed even date herewith in the names of Kenji Nakamura, Tomomichi Kanda and Hideaki Kikuchi as a national phase entry of PCT/JP2019/040022, which application is assigned to the assignee of the present application and is incorporated by reference herein.

TECHNICAL FIELD

The present invention relates to a method for producing a metal-resin composite including a metal member and a resin member which are joined together.

BACKGROUND ART

Metal-resin composites each including a metal member and a resin member which are joined together are used in a wide range of fields such as the automobile industry, the electronic device industry, etc. Examples of a general technique for joining together a metal member and a resin member include a technique using a fixing member such as a screw, a claw, or the like, and a technique using an adhesive, but these techniques have a problem of causing unsatisfactory joining strength or causing unsatisfactory hot-cold shock resistance. There is also a technique for joining a metal member and a resin member together by inserting in advance the metal member into a mold with a predetermined shape and then injecting a melt of the resin member into the mold. However, this technique has a problem that the metal member cannot be joined to the existing resin member or that joining strength is unsatisfactory.

In order to solve the problems, friction stir welding (also, simply referred to as "FSW" hereinafter) has been recently developed as a technique for joining together a metal member and a resin member. For example, Patent Literature 1 discloses a method for joining together a metal member and a resin member by using FSW, in which improvement in joining strength is achieved by specifying the outer diameter or push-in amount of a shoulder portion of a rotating tool for friction stirring used for pressing from the metal member side.

Patent Literature 2 discloses a method for joining together a metal body and a resin body by using FSW, in which improvement in joining strength is achieved by using a metal body having an oxide film formed on the surface thereof and breaking the oxide film.

Further, Patent Literature 3 discloses a method for joining together a metal body and a resin body by using FSW, in which improvement in joining strength is achieved by using a metal body having a hydroxide film formed on the surface thereof and exerting an interaction between the hydroxide film and the resin member.

CITATION LIST

Patent Literature

PTL 1: Japanese Patent No. 5531573
PTL 2: Japanese Patent No. 6096016
PTL 2: Japanese Unexamined Patent Application Publication No. 2017-13084

SUMMARY OF INVENTION

Technical Problem

As a result of earnest investigation on the joining methods described above, the inventors found that there is room for further improvement in terms of joining strength between a resin member and a metal member. The present invention has been achieved in consideration of the actual situation, and a problem of the invention is to provide a method for producing a metal-resin composite having excellent joining strength between a resin member and a metal member.

Solution to Problem

As a result of earnest research for solving the problems described above, the inventors found that a metal-resin composite having excellent joining strength between a resin member and a metal member can be produced by designing the thermal properties of a thermoplastic resin, contained in a resin member, within a specific range when the resin member and a metal member are joined together by meting the resin member with frictional heat generated in the surface of the metal member.

That is, the present invention relates to a method for producing a metal-resin composite including a metal member and a resin member, the resin member containing at least a thermoplastic resin. The method for producing a metal-resin composite includes a step of joining together the resin member and the metal member by melting the resin member with the frictional heat generated in the surface of the metal member on its side opposite to the resin member in a state where the metal member and the resin member are superposed. In addition, the melting point of the thermoplastic resin is 260° C. or more.

According to the production method, the resin member is melted with the frictional heat in the state where the metal member and the resin layer are overlapped and then joined to the metal member by the process of solidifying the melted resin member by allowing to cool. The production method uses a thermoplastic resin having a melting point (Tm) of 260° C. or more as the thermoplastic resin contained in the resin member, thereby exhibiting moderate heat resistance. Thus, the joining strength between the metal member and the resin member is improved by connection of the cooling rate of the metal member with the crystallization behavior of the resin member due to allowing to cool.

In the method for producing a metal-resin composite, the frictional heat is preferably generated by pressing a rotated rotating tool against the surface of the metal member on its side opposite to the resin member. This configuration causes a frictional heat of about 300° C. and thus more improves the joining strength between the metal member and the resin member by more connection of the cooling rate of the metal member with the crystallization behavior of the resin member due to allowing to cool.

In the method for producing a metal-resin composite, the melt viscosity of the resin member is preferably 200 to 6000 Pa·s. This configuration enhances adhesin between the metal member and the resin member during melting, and thus more improves the joining strength between the resin member and the metal member. In the present invention, when the resin member is composed of only a thermoplastic resin, the term "melt viscosity of the resin member" represents its melt viscosity, and when the resin member contains a filler and an olefinic copolymer, in addition to the thermoplastic resin, the term represents the melt viscosity of a resin composition containing these. The measurement conditions for the "melt viscosity" are described later.

In the method for producing a metal-resin composite, the content of the filler is preferably 1 to 150 parts by mass, assuming that the total amount of the thermoplastic resin in the resin member is 100 parts by mass. This configuration is preferred because of more improvement in the heat cycle resistance of joining strength between the metal member and the resin member and also improvement in the joining strength itself.

In the method for producing a metal-resin composite, the content of the olefinic copolymer is preferably 0.01 to 100 parts by mass, assuming that the total amount of the thermoplastic resin in the resin member is 100 parts by mass. This configuration is preferred because of more improvement in the heat cycle resistance of joining strength between the metal member and the resin member and also improvement in the joining strength itself.

The present invention also relates to a metal-resin composite including a metal member and a resin member which are joined together, the resin member containing at least a thermoplastic resin. The resin member and the metal member are joined together by melting the resin member with the frictional heat generated in the surface of the metal member on its side opposite to the resin member in a state where the metal member and the resin member are superposed. In addition, the melting point of the thermoplastic resin is 260° C. or more.

Further, the present invention relates to a metal-resin composite including a metal member and a resin member which are joined together, the resin member containing at least a thermoplastic resin. In addition, the metal member has a press mark in the surface on its side opposite to the resin member, and the melting point of the thermoplastic resin is 260° C. or more.

DESCRIPTION OF EMBODIMENTS

Figure 1:
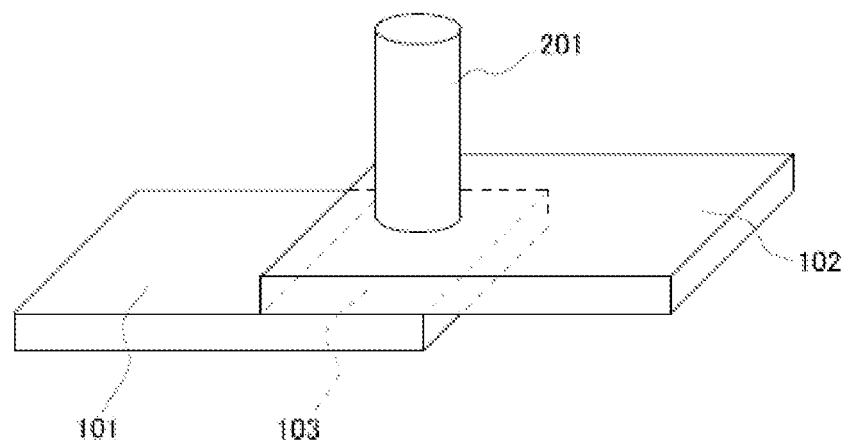
FIG. 1 is a drawing showing an example of a method for joining together a metal member and a resin member according to an embodiment of the present invention.

The present invention relates to a method for producing a metal-resin composite including a metal member and a resin member joined together. Each configuration is described below.
<Metal Member>

A known metal member can be used regardless of the type thereof. The present invention can directly use a metal member cut into a predetermined shape, but may also use a metal member having a roughened surface formed by surface-roughening at least a portion of the surface joined to a resin member. When the metal member having a roughened surface in at least a portion of the surface thereof is used, the melted resin member can be more deeply and securely penetrated into the roughened surface of the metal member having a surface area increased by surface roughening. Consequently, the joining strength between the resin member and the metal member is preferably improved by an anchor effect. A surface roughening method is described later.
[Metal Type]

Examples of a metal type include aluminum, copper, stainless, magnesium, iron, titanium, and an alloy containing these. More specific examples thereof include iron, an alloy (hereinafter an "iron alloy") such as stainless, a steel material, or the like, which contains iron as a main component, i.e., at a ratio of 20% by mass or more, more preferably 50% by mass or more, and still more preferably 80% by mass or more, and which also contains carbon, silicon, manganese, chromium, tungsten, molybdenum, phosphole, titanium, vanadium, nickel, zirconium, boron, or the like; aluminum and an alloy (hereinafter an "aluminum alloy") which contains aluminum as a main component and which also contains copper, manganese, silicon, magnesium. Zinc, or nickel; magnesium and an alloy (hereinafter a "magnesium alloy") which contains magnesium as a main component and which also contains zinc, aluminum, or zirconium; copper and an alloy (hereinafter a "copper alloy") which contains copper as a main component and which also contains zinc, tin, phosphorus, nickel, magnesium, silicon, or chromium; and titanium and an alloy (hereinafter a "titanium alloy") which contains titanium as a main component and which also contains copper, manganese, silicon, magnesium, zinc, or nickel. Among these, iron, an iron alloy, an aluminum alloy, a magnesium alloy, a copper alloy, and a titanium alloy are more preferred, and an iron alloy, an aluminum alloy, and a magnesium alloy are still more preferred.
[Surface Roughening Method]

A known method can be used as a surface roughening method, and examples thereof include:

(1) an immersion method using an erosive aqueous solution or an erosive suspension;

(2) an anodization method; and (3) mechanical cutting by blasting or laser processing. The roughening method is particularly preferably (1) the immersion method using an aqueous erosive solution or an erosive suspension or (2) the anodization method.

Before the fine concave-convex surface described above is formed, the metal member is preferably processed into a predetermined shape by cutting, plastic processing by pressing, punching, thinning such as cutting, grinding, discharge processing, or the like.

In addition, a primer layer may be formed on the surface of the metal member subjected to metal surface treatment. The material constituting the primer layer is not particularly limited but is usually composed of a primer resin material containing a resin component. The primer resin material is not particularly limited, and a known material can be used. Examples thereof include a known polyolefinic primer, an epoxy-based primer, a urethane-based primer, and the like. The method for forming the primer layer is not particularly limited, and the primer layer can be formed by, for example, coating a solution of the primer resin material or an emulsion of the primer resin material on the metal member subjected to the surface treatment. Examples of a solvent used for the solution include toluene, methyl ethyl ketone (MEK), dimethyl phosphoramide (DMF), and the like. Examples of a medium for the emulsion include an aliphatic hydrocarbon medium, water, and the like.

<Resin Member>

For example, a molded product produced by melt-molding a thermoplastic resin having a melting point of 260° C. or more can be used as the resin member. Usable examples of the thermoplastic resin include a polyarylene sulfide (PAS) resin, a polyamide resin, an aromatic polyamide resin, a polyarylate resin, a thermoplastic polyimide resin, a polyamide-imide resin, a polyether ether ketone resin, a polyketone resin, a liquid crystal polyester resin, and the like. Among these, a PAS resin is preferred from the viewpoint of the melt viscosity and recrystallization behavior. Further, the PAS resin is particularly preferably a polyphenylene sulfide (also referred to as "PPS" hereinafter) resin.

From the viewpoint of improving the joining strength to the metal member, the content of the PAS resin is preferably 60% by mass or more and more preferably 70% by mass or more, assuming that the total amount of the thermoplastic resin in the resin member is 100% by mass.

[Polyarylene Sulfide (PAS) Resin]

The PAS resin has a resin structure having, as a repeating unit, a structure in which an aromatic ring and a sulfur atom are bonded to each other, and is specifically a resin having a repeating unit having a structural part represented by the following general formula (1):

[Chem. 1]

Formula (1)

(in the formula, $R^1$ and $R^2$ each independently represent a hydrogen atom, an alkyl group having carbon atoms within a range of 1 to 4, a nitro group, an amino group, a phenyl group, a methoxy group, or an ethoxy group) and, if required, a trifunctional structural part represented by the following general formula (2):

[Chem. 2]

Formula (2)

The amount of the trifunctional structural part represented by the general formula (2) is preferably within a range of 0.001 to 3 mol % and particularly preferably within a range of 0.01 to 1 mol % relative to the total number of moles with other structural parts.

Herein, in the structural part represented by the general formula (1), $R^1$ and $R^2$ in the formula are each independently particularly preferably a hydrogen atom from the viewpoint of mechanical strength of the PAS resin. In this case, for example, bonds are formed at the para-position represented by the following formula (3) and at the meta-position represented by the following formula (4).

[Chem. 3]

Formula (3)

Formula (4)

Among these, in view of heat resistance and crystallinity of the PAS resin, the PAS resin particularly preferably has a structure in which the sulfur atom bond to an aromatic ring in the repeating unit is particularly preferably formed at the para-position represented by the general formula (3).

In addition, the PAS resin may contain not only the structural parts represented by the general formulae (1) and (2) but also structural parts represented by the following structural formulae (5) to (8) at a content of 30 mol % or less of the total with the structural parts represented by the general formula (1) and the general formula (2).

[Chem. 4]

Formula (5)

Formula (6)

Formula (7)

Formula (8)

In the present invention, from the viewpoint of heat resistance and mechanical strength of the PAS resin, the amount of the structural parts represented by the general formulae (5) to (8) is particularly preferably 10 mol % or less. When the PAS resin contains the structural parts represented by the general formulae (5) to (8), the bonding forms thereof may be either a random copolymer or a block copolymer.

Also, the PAS resin may have a naphthyl sulfide bond in its molecular structure, and the amount thereof is preferably 3 mol % or less and particularly preferably 1 mol % relative to the total number of moles with other structural parts.

(Production Method)

Examples of a method for producing the PAS resin include, but are not particularly limited to: 1) a method of polymerizing a dihalogeno-aromatic compound with a polyhalogeno-aromatic compound or another copolymerization component added if required in the presence of sulfur and sodium carbonate; 2) a method of polymerizing a dihalogeno-aromatic compound with a polyhalogeno-aromatic compound or another copolymerization component added if required in the presence of a sulfiding agent in a polar solvent; 3) a method of self-condensing p-chlorothiophenol with another copolymerization compound added if required; 4) a method of melt-polymerizing a diiodo aromatic compound and elemental sulfur under reduced pressure in the presence of a polymerization inhibitor, which may have a functional group such as a carboxyl group, an amino group, or the like; and the like. Among these methods, the method 2) is generally used and preferred. During reaction, an alkali metal salt of carboxylic acid or sulfonic acid or alkali hydroxide may be added for adjusting the degree of polymerization. The method 2) is particularly preferably a method for producing the PAS resin in which a hydrous sulfiding agent is introduced into a mixture containing the heated organic polar solvent and dihalogeno-aromatic compound at a rate which permits removal of water from the reaction mixture, and the dihalogeno-aromatic compound and the sulfiding agent are reacted with a polyhalogeno-aromatic compound added if required in the organic polar solvent, and in which the water amount in the reaction system is controlled within a range of 0.02 to 0.5 moles per mole of the organic polar solvent (refer to Japanese Unexamined Patent Application Publication No. 07-228699); or a method in which a dihalogeno-aromatic compound and, if required, a polyhalogeno-aromatic compound or another copolymerization component are added in the presence of a solid alkali metal sulfide and an aprotic polar organic solvent, and the alkali metal hydrosulfide is reacted with an organic acid alkali metal salt while the organic acid alkali metal salt is controlled within a range of 0.01 to 0.9 moles per mole of sulfur source, and the water amount in the reaction system is controlled within a range of 0.02 moles per mole of the aprotic polar organic solvent (refer to Pamphlet No. WO2010/058713). Examples of the dihalogeno-aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and a compound having an alkyl group having carbon atoms within a range of 1 to 18 in the aromatic ring of each of the compounds described above. Examples of the polyhalogeno-aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, 1,4,6-trihalonaphthalene, and the like. The halogen atom contained in each of the compounds is preferably a chlorine atom or a bromine atom.

Examples of a post-treatment method for the reaction mixture containing the PAS resin produced in the polymerization step include, but are not particularly limited to: (1) a method in which after polymerization reaction, first the solvent is distilled off from the reaction mixture as it is or after adding an acid or base to it under reduced pressure or normal pressure, and next the solid after distilling off the solvent is washed with the reaction solvent (or an organic solvent having the equivalent solubility for a low-molecular polymer), acetone, methyl ethyl ketone, an alcohol, or the like one or two or more times, and further neutralized, washed with water, filtered, and dried; (2) a method in which after polymerization reaction, a solvent (solvent soluble in the polymerization solvent used and poor for at least PAS), such as water, acetone, methyl ethyl ketone, an alcohol, an ether, a halogenated hydrocarbon, an aromatic hydrocarbon, an aliphatic hydrocarbon, or the like, is added as a sedimentation agent to the reaction mixture to sediment solid products such as PAS and an inorganic salt, which are then filtered, washed with water, and dried; (3) a method in which after polymerization reaction, the reaction solvent (or an organic solvent having equivalent solubility for a low-molecular polymer) is added to the reaction mixture and stirred, and then a low-molecular-weight polymer is removed by filtration and then washed with a solvent, such as water, acetone, methyl ethyl ketone, an alcohol, or the like one or two or more times, then neutralized, water-washed, filtered, and then dried; (4) a method in which after polymerization reaction, the reaction mixture is water-washed by adding water and filtered, and if required, acid-treated by adding an acid during water washing, and then dried; (5) a method in which after polymerization reaction, the reaction mixture is filtered and, if required, washed with the reaction solvent one or two or more times, further water-washed, filtered, and then dried; and the like.

In the post-treatment methods (1) to (5) exemplified above, the PAS resin may be dried in vacuum or in air or an inert gas atmosphere such as nitrogen.

(Melt Viscosity)

Because of improvement in the adhesion between the metal member and the resin member during melting and more improvement in the joining strength between the metal member and the resin member, the melt viscosity of the resin member is within a range of preferably 200 Pa·s or more and more preferably 1000 Pa·s or more to preferably 6000 Pa·s or less and more preferably 5000 Pa·s or less. In the present invention, the melt viscosity represents a value measured under the condition of the same resin temperature as during joining and the condition of a shear rate of 10/s. In the present invention, as an example of the measurement method, measurement is performed by using a capillary rheometer according to JIS K7199 or ISO 11443. The measurement shows a value measured at a shear rate of 10/s under the condition of a resin temperature separately measured during joining and the condition of ratio L/D=40 between orifice length (L) to the orifice diameter (D). When the melt viscosity of the resin member measured under the conditions described above is set within the range described above, the joining strength between the resin member and the metal member can be more enhanced.

(Melting Point (Tm) and Recrystallization Temperature (Tc2))

The present invention uses as a thermoplastic resin having a melting point (Tm) of 260° C. or more as the thermoplastic resin contained in the resin member. The thermoplastic resin shows moderate heat resistance, and thus the joining strength between the metal member and the resin member is improved by connection of the cooling rate of the metal member with the crystallization behavior of the resin member during allowing to cool. From the viewpoint of improving the joining strength between the resin member and the metal member, the melting point (Tm) of the resin member, particularly the PAS resin, is preferably within a range of 270° C. or more and more preferably within a range of 270° C. to 300° C. In addition, a different (Tm−Tc) between the melting point (Tm) and recrystallization temperature (Tc2) represents a temperature difference until the melted resin is solidified by allowing to cool. In the present invention, a (Tm−Tc) of 35° C. or more is preferred because the joining strength between the metal member and the resin member is more improved by more connection of the cooling rate of the metal member with the crystallization behavior of the resin member due to allowing to cool. In particular, the metal member and the resin member are joined together by using a method of friction stir welding (FSW) described later, the frictional heat becomes about 300° C., and thus Tm of 260° C. or more and a (Tm−Tc) of 35° C. or more are preferred because of more improvement in the joining strength between the metal member and the resin member. Because the degree of crystallization of the thermoplastic resin also affects the joining strength between the metal member and the resin member, the melting heat amount (ΔH) is preferably 10 J/g or more. The melting point (Tm) and recrystallization temperature (Tc2) can be measured by using a differential scanning calorimeter (DSC). For example, the melting point (Tm) is measured by heating to a temperature of 10° C. or more higher than the resin melting point at a heating rate of 20° C./min, and then the recrystallization temperature (Tc2) can be measured by temperature lowering at a rate of 20° C./min.

(Non-Newtonian Index)

In view of improvement in joining strength between the resin member and the metal member, the non-Newtonian index of the resin member, particularly the PAS resin, used in the present invention is preferably within a range of 0.90 to 2.00. When a linear PAS resin is used, the non-Newtonian index is preferably within a range of 0.90 to 1.50 and more preferably within a range of 0.95 to 1.25. Such a PAS resin has excellent mechanical and physical properties, fluidity, and abrasion resistance. However, the non-Newtonian index (N value) is a value calculated by using a formula below from the shear rate and shear stress measured by using Capilograph at 300° C. under the condition of ratio (L/D) =40 of the orifice length (L) to orifice diameter (D), $$SR = K \cdot SS^N \qquad \text{[Math. 1]}$$

[wherein, SR represents the shear rate (1/second), SS represents the shear stress (dyne/cm$^2$), and K represents a constant]. This shows that the closer to 1 the N value is, the closer to linear the structure of the PPS resin is, and the higher the N value is, the more branched the structure is.

[Olefinic Polymer]

When the PAS resin is used as the resin member, an olefinic polymer may be mixed together with the PAS resin from the viewpoint of improving toughness and hot-cold shock properties of the PAS resin and further from the viewpoint of improving the joining strength between the meatal member and the resin member. Examples of the olefinic polymer include a polymer produced by polymerizing one or two or more α-olefins such as ethylene, propylene, 1-butene, 1-petene, 4-methyl-1-pentene, isobutylene, and the like, and a copolymer of the α-olefin with α,β-unsaturated acid or its alkyl ester, such as (meth)acrylic acid, methyl (meth)acrylate, ethyl (meth)acrylate, butyl (meth)acrylate, or the like. In the present invention, the term "(meth)acrylic" represents "acrylic" and/or "methacrylic".

From the viewpoint of improving compatibility with the PAS resin and other components, the olefinic polymer preferably has a functional group therein. This can improve the hot-cold shock properties of the resin member. Examples of the functional group include an epoxy group, a carboxyl group, an isocyanate group, an oxazoline group, and a group represented by the formula: R(CO)O(CO)— or R(CO)O— (in the formula, R represents an alkyl group having carbon atoms within a range of 1 to 8). The olefinic polymer having such a functional group can be produced by, for example, copolymerizing the α-olefin with a vinyl polymerizable compound having the functional group. Examples of the vinyl polymerizable compound having the functional group include, in addition to the α,β-unsaturated acid and its alkyl ester, maleic acid, fumaric acid, itaconic acid, and other α,β-unsaturated dicarboxylic acids having carbon atoms within a range of 4 to 10 and derivatives thereof (mono or diesters and anhydrides thereof), and glycidyl (meth)acrylate, and the like. Among these olefinic polymers, from the viewpoint of improving toughness and shock resistance, the olefinic polymer is preferably an olefinic polymer having at least one functional group selected from the group consisting of an epoxy group, a carboxyl group, and a group represented by the formula: R(CO)O(CO)— or R(CO)O— (in the formula, R represents an alkyl group having carbon atoms within a range of 1 to 8), and an olefinic resin particularly preferably contains a copolymer of alkane, alkyl acrylate, and glycidyl acrylate.

In combination with the PAS resin, the content of the olefinic polymer is within a range of preferably 0.01 parts by mass or more and more preferably 0.1 parts by mass or more to preferably 30 parts by mass or less and more preferably 15 parts by mass or less, assuming that the total amount of the PAD resin is 100 parts by mass. When the content of the olefinic polymer is set within the range described above, the joining strength between the metal member and the resin member, and the heat cycle resistance, shock resistance, and toughness of the resin member can be improved.

[Filler]

In order to improve the joining strength with the metal member and heat cycle resistance, a filler in addition to the thermoplastic resin may be mixed in the resin member used in the present invention. A well-known common material can be used as the filler as long as it does not impair the effect of the present invention, and usable examples thereof include fillers having various shapes such as a fibrous shape, a non-fibrous shape such as a particle shape or a plate-like shape, and the like. Usable examples thereof include fibrous fillers such as glass fibers, carbon fibers, silane glass fibers, ceramic fibers, aramid fibers, metal fibers, fibers of potassium titanate, silicon carbide, calcium silicate, wollastonite and the like, natural fibers, and the like. Other usable examples include non-fibrous fillers such as glass beads, glass flakes, barium sulfate, clay, pyrophyllite, bentonite, sericite, mica, mica, talk, attapulgite, ferrite, calcium silicate, calcium carbonate, magnesium carbonate, glass beads, zeolite, milled fibers, calcium sulfate, and the like.

When the filler is mixed, the mixing ratio thereof is not particularly limited as long as the effect of the invention is not impaired, and the ratio cannot be specified unconditionally because it depends on the purpose. The ratio is within a range of preferably 1 part by mass or more and more preferably 10 parts by mass or more to preferably 200 parts by mass or less and more preferably 100 parts by mass or less relative to 100 parts by mass of the polyarylene sulfide resin. This range is preferred because a resin composition exhibits good mechanical strength and moldability.

[Other Component]

In particular, when the PAS resin is used, if required, a phenol resin may be further mixed as an arbitrary component in the resin member used in the present invention. The phenol resin represents a thermoplastic polymer having a phenol skeleton, and either a novolac-type phenol resin or a bisphenol-type phenol resin can be preferably used. Further, the novolac-type phenol resin is more preferred.

The phenol resin preferably a higher hydroxyl group equivalent, and the range thereof may be a known range. Because bonding force or adhesive force can be more improved, the hydroxyl group equivalent is within a range of preferably 80 g/equivalent or more, more preferably 100 g/equivalent or more, and still more preferably 110 g/equivalent to preferably 200 g/equivalent or less, more preferably 180 g/equivalent or less, and still more preferably 150 g/equivalent or less.

In addition, when the phenol resin is mixed, the mixing ratio thereof is not particularly limited as long as the effect of the invention is not impaired, and the ratio cannot be specified unconditionally because it depends on the purpose. The ratio is within a range of preferably 0.1 part by mass or more and more preferably 1 part by mass or more to preferably 10 parts by mass or less and more preferably 3 parts by mass or less relative to 100 parts by mass of PAS resin. Setting within this range is preferred because, for example, when the resin member and the metal member are joined/integrated and used, the joining strength is improved. In addition, mixing the phenol resin can more decrease the viscosity of the resin composition containing the PAS resin and can improve fluidity during molding.

In addition, when the PAS resin is used as a raw material of the resin member used in the present invention, another synthetic resin can be properly further mixed as an arbitrary component according to applications. Examples thereof include an epoxy resin, a polyester resin, a polyamide resin, a polyimide resin, a polyetherimide resin, a polycarbonate resin, a polyphenylene ether resin, a polysulfone resin, a polyether sulfone resin, a polyether ether ketone resin, a polyether ketone resin, a polyarylene resin, a polyethylene resin, a polypropylene resin, a polytetrafluoroethylene resin, a polydifluoroethylene resin, a polystyrene resin, an ABS resin, a phenol resin, a urethane resin, a liquid crystal polymer, and the like (simply referred to as a "synthetic resin" hereinafter). In the present invention, the synthetic resin is not an essential component, but when mixed, the mixing ratio is not particularly limited as long as the effect of the present invention is not impaired, and the ratio cannot be unconditionally specified because it depends on the purpose thereof. However, the ratio of the synthetic resin mixed in the resin composition used as a raw material in the present invention is, for example, about within a range of preferably 0.01 parts by mass or more to preferably 20 parts by mass or less relative to 100 parts by mass of the PAS resin. In other words, the mixing ratio, on a mass basis, of the PAS resin relative to the total amount of the PAS resin and the synthetic resin is within a range of preferably (100/100.01) or more to preferably (100/120) or less.

Further, when the PAS resin is used as the raw material of the resin member used in the present invention, if required, well-known common additives may be also mixed as arbitrary components. Examples of the additives include a coloring agent, an antistatic agent, an antioxidant agent, a thermal stabilizer, an ultraviolet stabilizer, an ultraviolet absorber, a foaming agent, a flame retardant, a flame retardant auxiliary, an anti-rust agent, a coupling agent, and the like. These additives are not essential components, but when mixed, the mixing ratio thereof is not particularly limited as long as the effect of the present invention is not impaired, and the ratio cannot be unconditionally specified because it depends on the purpose thereof. However, the additives may be properly adjusted and used within a range of preferably 0.01 parts by mass or more to preferably 1,000 parts by mass or less relative to 100 parts by mass of the PAS resin according to purpose so that the effect of the present invention is not impaired.

[Method for Producing Resin Member]

The resin member according to the present invention can be produced by molding, into an arbitrary shape, a resin composition prepared by melt-kneading the thermoplastic resin and further, if required, the materials exemplified above. When the PAS resin is used as the thermoplastic resin, for example, the PAS resin as the essential component and, if required, other arbitrary components are mixed and melt-kneaded at a temperature equal to or higher than the melting point of the PAS resin. In embodiments below, description is made on the basis of a case using the PAS resin as the thermoplastic resin.

A preferred method for preparing the resin composition includes adding and dry-blending the essential component and the arbitrary components in any one of various forms, such as a powder, pellets, or strips, in a ribbon blender, a Henschel mixer, a V-blender, or the like, and then adding to a well-known melt-kneader, such as a Banbury mixer, a mixing roll, a single-screw or twin-screw extruder, or a kneader. Then, the resin composition can be prepared through the step of melt-kneading within a temperature range in which the resin temperature is equal to or higher than the melting point of the PAS resin, preferably within a temperature range of melting point+10° C. or more, more preferably within a temperature range of melting point+10° C. to melting point+100° C., and still more preferably within a temperature range of melting point+20° C. to melting point+50° C. The components may be added and mixed in the melt-kneader at once or in a divided manner.

From the viewpoint of dispersibility and productivity, the melt-kneader is preferably a twin-screw kneading extruder, and, for example, melt-kneading is preferably performed while properly adjusting the discharge amount of the resin component within a range of 5 to 500 (kg/hr) and the crew rotational speed within a range of 50 to 500 (rpm), and melt-kneading is more preferably performed under the condition in which the ratio (discharge amount/screw rotational speed) is within a range of 0.02 to 5 (kg/hr/rpm). When among these components, the filler and the additives are added, from the viewpoint of dispersibility, these are preferably added to the twin-kneading extruder from a side feeder of the extruder. The position of the side feeder is preferably at a position where the ratio of the distance from the extruder resin inlet to the side feeder to the total screw length of the twin-screw kneading extruder is preferably within a range of 0.1 to 0.9. The ratio is particularly preferably within a range of 0.3 to 0.7.

The resin composition prepared by melt-kneading as described above is a melt mixture containing the essential components and the arbitrary components added if required and components derived therefrom, and after melt-kneading, the mixture is preferably processed into a form such as pellets, chips, grains, or a powder by a well-known method and, if required, pre-dried at a temperature of 100° C. to 150° C., and then subjected to various molding.

The resin member used in the present invention can be produced by, for example, melt-molding the PAS resin composition. The melt-molding may be performed by a known method, and applicable examples thereof include various molding methods such as injection molding, compression molding, extraction molding for a composite, a sheet, a pipe, and the like, pultrusion molding, blow molding, transfer molding, and the like. Injection molding is particularly suitable. In the case of injection molding, various molding conditions are not particularly limited, and molding can be usually performed by a general method. For example, the PAS resin composition may be injected into a mold from a resin outlet and molded after passing through the step of melting in an injection molding machine within a temperature range in which the resin temperature is equal to or higher than the melting point of the PAS resin, preferably within a temperature range of the melting point+

10° C. or more, more preferably within a temperature range of the melting point+10° C. to the melting point+100° C., and still more preferably within a temperature range of the melting point+20° C. to the melting point+50° C. In this case, the mold temperature is also set within a known temperature range, preferably within a range of room temperature (23° C.) to 300° C., more preferably within a range of 40° C. to 200° C., and most preferably within a range of 120° C. to 180° C.

<Step of Joining Together Resin Member and Metal Member>

The method for producing the metal-resin composite according to the present invention includes the step of melting the resin member with the frictional heat generated in the surface of the metal member on its side opposite to the resin member in a state where the metal member and the resin member are superposed, and then joining together the resin member and the metal member. In particular, the present invention preferably includes the step of generating frictional heat by pressing a rotated rotating tool on the surface of the metal member on its side opposite to the resin member in a state where the metal member and the resin member are superposed, melting the resin member by heat transfer of the frictional heat through the metal member, and then joining together the resin member and the metal member. In particular, the latter is referred to as a "friction stir welding (FSE)". An example of the joining step according to an embodiment of the present invention is described below using FSW as an example. The joining step using FSW includes (1) a step of superposing the metal member and the resin member, and (2) a step of friction stirring.

(1) Step of Superposing the Metal Member and the Resin Member

First, the metal member and the resin member are prepared and superposed on each other. When the metal member having a roughened surface in at least a portion of the surface thereof is used, the resin member is superposed so as to be in contact with at least a portion of the roughened surface of the metal member. In an example shown in FIG. 1, a roughened surface 103 is formed in one (the lower-side surface in FIG. 1) of the surfaces of a metal member 102, and a resin member 101 is superposed so as to be in contact with the roughened surface 103. The metal member 102 and the resin member 101 superposed on each other are fixed by a fixing unit not shown.

(2) Friction Stirring Step

In the friction stirring step, a rotated rotating tool 201 is pressed on the surface of the metal member 102 on its side opposite to the resin member 101. The material and shape of the rotating tool 201 can be variously changed according to the metal type and shape of the metal member 102, and a metal harder than the metal constituting the metal member 102 is preferably used as the material. In addition, FIG. 1 shows, an example in which the rotating tool 201 has a cylindrical shape and a flat lower surface (surface to be brought into contact with the metal member 102), but the lower surface may have a R-like shape, a taper shape, or a taper R-like shape. In addition, for example, a pin for positing may be formed at the center of the lower surface of the rotating tool 201, or a plurality of pins or any desired shape, such as a spiral or helical shape, may be formed on the lower surface of the rotating tool 201 in order to efficiently generate the frictional heat. The rotating tool 201 may be vertical to the metal member 102 as shown in FIG. 1 or the rotating tool 201 may be inclined during pressing. In addition, during pressing, the push-in speed and push-in pressure of the rotating tool 201 and the rotational speed of the rotating tool 201 can be arbitrarily designed.

In the friction stirring step, the frictional heat is generated in the surface of the metal member by rotating the rotating tool while pressing the rotating tool on the surface of the metal member on its side opposite to the resin member, and the frictional heat is transferred through the metal member to melt the resin member in contact with the metal member on the opposite side. When the metal member has the roughened surface, formed by surface roughing, in at least a portion of the portion in contact with the resin member, the metal member and the resin member are adhered to each other while the melted resin is deeply penetrated into the roughened surface. Then, the rotating tool is separated from the surface of the metal member, the rotational speed is decreased under pressing of the rotating tool, or supply of the frictional heat is suppressed or stopped by stopping the rotation. Thus, the resin member adhered and penetrated into the roughened surface is solidified associated with cooling by heat radiation from the metal member and the resin member and heat transfer to peripheral device parts, thereby joining together both members.

As described above, the metal-resin composite produced by FSW has excellent joining strength between the metal member and the resin member. Whether or not the metal-resin composite is produced by FSW can be verified by, for example, (i) a press mark present on the surface of the metal member or (ii) the presence of a projection mark of the metal member to the resin member, as explained below.

(i) Press Mark Present on the Surface of the Metal Member

Figure 2:
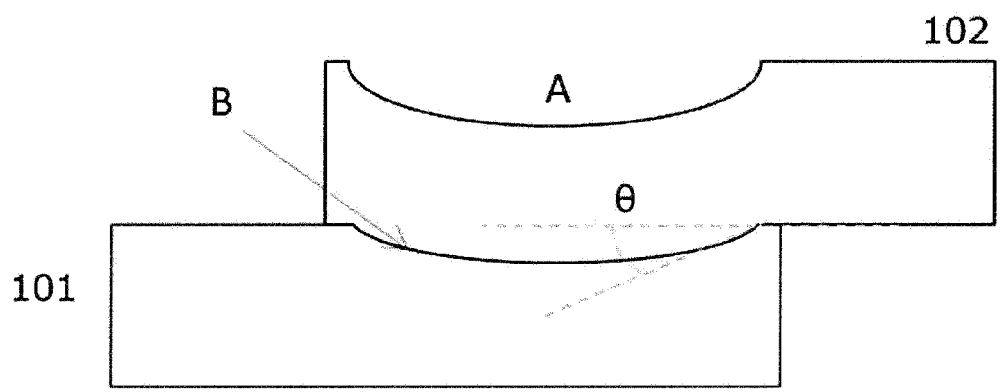
FIG. 2 is a drawing showing an example of a sectional view of a joining site of a metal-resin composite produced by friction stir welding (FSW).
Figure 3:
FIG. 3 (a)-(e) are drawings showing examples of a front view of a press mark formed on the surface of a metal member of a metal-resin composite produced by friction stir welding (FSW).
Figure 3:
Figure 3:
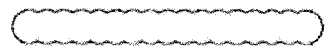
Figure 3:
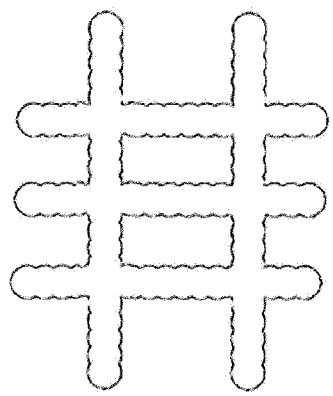
Figure 3:
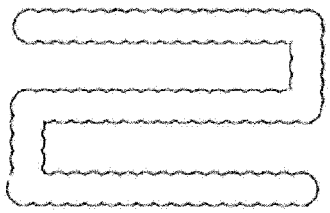

FIG. 2 shows an example of a sectional view of the joining part of the metal-resin composite produced by FSW. As shown in FIG. 2, in the friction stirring step of FSW, a press mark A is formed in a concave shape by pressing the rotating tool 201 on the surface of the metal member 102 on its side opposite to the resin member 101. FIG. 3 (a)-(e) show examples of a front view of the press mark formed on the surface of the metal member of the metal-resin composite produced by FSW. As shown in FIG. 3 (a)-(e), the press mark may have FIG. 3 (a) one or two or more independent circular shapes or FIG. 3 (b) a straight line as an overall shape formed by overlapping two or more circular press marks. Also, the press mark may have FIG. 3 (c) an overall shelf-like shape, FIG. 3 (d) lattice-like or network shape, or FIG. 3 (e) zigzag shape, which is formed by overlapping two or more circular press marks.

The diameter (R) of a circular press mark cannot be unconditionally limited because it has various forms according to the thermoplastic resin and other compounding components constituting the resin member or the method and degree of surface roughening of the metal member. However, the diameter (R) is within a range of preferably 1 [mm] or more, more preferably 2 [mm] or more, still more preferably 3 [mm] or more to preferably 50 [mm] or less, more preferably 40 [mm] or less, and still more preferably 30 [mm] or less. Also, the ratio of the press mark area to the area of contact between the surface-roughened metal member and the resin member cannot be unconditionally limited because it has various forms according to the thermoplastic resin and other compounding components constituting the resin member or the method and degree of surface roughening of the metal member. The ratio is within a range of preferably 1 [%] or more, more preferably 10 [%], and still more preferably 20 [%] to preferably 100 [%] or less, more preferably 90 [%] or less, and still more preferably 80 [%] or less.

(ii) Projection Mark of the Metal Member to the Resin Member Side

The projection mark of the metal member to the resin member side depends on the thickness and material of the metal member and the push-in degree of the rotating tool, but has a circular-arc shape in a sectional view as shown in FIG. 2 (B in FIG. 2). When the degree of projection of the metal member 102 to the resin member 101 side is represented by the angle (θ) with respect to the metal member 102, the angle (θ) is within a range of preferably 20 [°] or less, more preferably 15 [°] or less, and still more preferably 10 [°] or less.

(Application of Metal-Resin Composite)

Applicable examples of main applications of the metal-resin composite according to the present invention include electric-electronic components such as casings of electronic devices of various domestic electric appliances, a cellular phone, PC (Personal Computer), and the like, a protecting/supporting member-plural individual semiconductors or modules for a box-shape electric-electronic component integrated module, a sensor, a LED lamp, a connector, a socket, a resistor, a relay case, a switch, a coil bobbin, a capacitor, a variable condenser case, an optical pick-up, an oscillator, various terminal plates, a transformer, a plug, a printed substrate, a tuner, a speaker, a microphone, a headphone, a small-size motor, a magnetic head base, a power module, a terminal block, a semiconductor, a liquid crystal, a FDD carriage, a FDD chassis, a motor brush holder, a parabolic antenna, a computer-related component, and the like; house/office electric appliance components such as a VTR component, a television component, an iron, a hair dryer, a rice cooker components, a microwave oven component, an audio component, components of sound/video device components such as audio/laser disc/compact disc/DVD disk/blue-ray disc and the like, an illumination component, a refrigerator component, an air conditioner component, a type writer component, a word processor component, and a water-section device components such as a water heater, a bath hot-water amount/temperature sensor, and the like; machine-related components such as an office computer-related component, a telephone-related component, a facsimile-related component, a copying machine-related component, a washing jig, a motor component, a lighter, a typewriter, and the like: optical device/precision machine-related components such as a microscope, a binoculars, a camera, a watch, and the like; automobile/vehicle-related components such as an alternator terminal, an alternator connector, a brush holder, a slip ring, an IC regulator, a potentiometer base for a light dimmer, a relay block, an inhibitor switch, various valves such as an exhaust gas valve, various fuel-related/exhaust system/intake system pipes, an air intake nozzle snorkel, an intake manifold, a fuel pump, an engine cooling water joint, a calibrator main body, a calibrator spacer, an exhaust gas sensor, a cooling water sensor, an oil temperature sensor, a brake pad wear sensor, a throttle position sensor, a crank shaft position sensor, an air flow meter, a brake pad wear sensor, a thermostat base for an air conditioner, a heating hot-air flow control valve, a brush holder for a radiator motor, a water pump impeller, a turbine vane, a wiper motor-related component, a distributer, a starter switch, an ignition coil and a bobbin thereof, a motor insulator, a motor rotor, a motor core, a starter relay, a wire harness for transmission, a wind washer nozzle, an air conditioner panel switch substrate, a coil for a fuel-related electromagnetic valve, a connector for a fuse, a phone terminal, an electrical component insulating plate, a step motor rotor, a lump socket, a lamp reflector, a lamp housing, a brake piston, a solenoid bobbin, an engine oil filter, an ignition system case, a power module, an inverter, a power device, an intelligent power module, an insulating gate bipolar transistor, a power control unit, a reactor, a converter, a capacitor, an insulator, a motor terminal block, a battery, an electric compressor, a battery current sensor, a junction block, a case for housing an ignition coil for a DLI system, and the like; and other various applications.

EXAMPLES

The present invention is described in further detail by giving examples below. In addition, "parts" and "%" are on a mass basis unless otherwise specified.

Measurement Example 1 (Measurement of Joining Strength of Metal-Resin Composite)

Shear tensile measurement was performed for a metal-resin composite (Type-B model according to ISO 19095) using a material tester (Shimadzu Corporation, AG-IS) at a tensile speed of 5 mm/min. The average value (n=5) of maximum stress values until the metal-resin composite reached fracture was determined at room temperature as a measurement temperature. Next, after the shear tensile measurement, a fracture surface of the metal member fractured was observed with an optical microscope to estimate the joining area with the resin member. The joining strength (MPa) was calculated as a value obtained by dividing the average value of maximum stress value measured until fracture was reached as described above by the joining area ((average value of maximum stress values until fracture was reached)/(joining area)).

Measurement Example 2 (Heat Cycle Test (Heat Cycle Resistance) of Metal-Resin Composite)

A metal-resin composite (Type-B model according to ISO 19095) was introduced in a hot-cold shock testing apparatus (Espec Corporation, "TSA-103EL"), and a heat cycle of −40° C./30 minutes→160° C./30 minutes was performed in 100 cycles (1 hour per cycle). After the heat cycle test, the metal-resin composite was subjected to "shear tensile test" according to Measurement Example 3 to determine the joining strength after the heat cycle test.

The joining strength before the heat cycle test was regarded as the "initial joining strength", and "(joining strength after the heat cycle test)/(joining strength before the heat cycle test)×100" was regarded as a retention rate (%). It means that the higher the retention rate is, the more excellent the heat cycle resistance is.

Measurement Example 3 (Melting Point, Recrystallization Temperature, Melting Heat Amount, and Crystallization Heat Amount of Resin Member)

A differential scanning calorimeter ("PYRIS Diamond DSC" manufactured by Perkin Elmer, Inc.) was used, and based on an analytical method (DSC method; according to JIS K-7121) by the differential scanning calorimeter, a temperature showing the maximum endothermic peak was measured as the melting point (Tm) by heating from room temperature to 350° C. at 20° C./min, and a temperature showing the maximum exothermic peak was measured as the recrystallization temperature (Tc2) by lowing the temperature from a melt state at 20° C./min. Also, the heat absorption amount during melting was measured, and the melting heat amount (ΔH) was determined.

Measurement Example 4 (Melt Viscosity of Resin Member)

Measurement was performed by using a capillary rheometer (Capilograph 1D manufactured by Toyo Seiki Co., Ltd.) according to JIS K7199 or ISO 11443 under the condition of the resin temperature separately measured during joining and the condition of ratio (L/D)=40 of the orifice length (L) to orifice diameter (D) at a shear rate of 10/s. The resin temperature during joining was measured separately from actual joining. In this case, the same metal member and the same resin member were used, and the maximum temperature was measured when a thermocouple-type temperature sensor with a thickness of 50 microns was held on the surface 103 in FIG. 1 and the tool was pushed and stirred under the same conditions.

In examples, a PPS resin produced by mixing the PPS resin produced in each of Production Examples below and, if required, a filler and an olefinic copolymer, a polycarbonate (also referred to as "PC" hereinafter) resin (product name "Iupilon E-2000" manufactured by Mitsubishi Engineering-Plastics Corporation), a polyamide (also referred to as "PA" hereinafter) resin (trade name "A3W" manufactured by "BASF Corporation"), and a polyethylene terephthalate (also referred to as "PET" hereinafter) resin (trade name "Novapex G5" manufactured by Mitsubishi Chemical Co., Ltd.) were evaluated by the measurement methods described above.

(Production Example 1 of PPS Resin) Production of Polyphenylene Sulfide Resin (1)

[Step 1]

In a 150-liter autoclave provided with a pressure gauge, a thermometer, a condenser, a decanter, and a stirring blade with a rectifying column connected thereto, 33.075 parts by mass (225 parts by mole) of p-dichlorobenzene (abbreviated as "p-DCB" hereinafter), 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged, and then heated to 173° C. over 5 hours under stirring in a nitrogen atmosphere, distilling off 27.300 parts by mass of water. Then, the autoclave was closed, and p-DCB distilled off by azeotrope during dehydration was separated by the decanter and appropriately returned to the autoclave. In the autoclave after the completion of dehydration, a fine-particle anhydrous sodium sulfide composition was in a state of being dispersed in p-DCB. The content of NMP in the composition was 0.079 parts by mass (0.8 parts by mole) and thus it was shown that 98% by mole (33.7 parts by mole) of NMP charged was hydrolyzed to a sodium salt (abbreviated as "SMAB" hereinafter) of NMP ring-opening compound (4-(methylamino)butyric acid). The SMAB amount in the autoclave was 0.147 parts by mole per mole of sulfur atoms present in the autoclave. When the total amount of NaSH and NaOH was converted into anhydrous Na2S, the theoretical amount of dehydration was 27.921 parts by mass, and thus it was shown that 0.609 parts by mass (33.8 parts by mole) in the amount of 0.878 parts by mass (48.8 parts by mole) of water remaining in the autoclave was consumed by hydrolysis reaction of NMP and NaOH and is not present as water in the autoclave, and 0.269 parts by mass (14.9 parts by mole) of the residue remains in the form of water or crystal water in the autoclave. The amount of water in the autoclave was 0.065 moles per mole of sulfur atoms present in the autoclave.

[Step 2]

After the completion of the dehydration step, the internal temperature was decreased to 160° C. by cooling, and 46.343 parts by mass (467.5 parts by mole) of NMP was charged and then heated to 185° C. The amount of water in the autoclave was 0.025 moles per mole of NMP charged in step 2. When the gauge pressure reached 0.00 MPa, the valve connected to the rectifying column was opened, and the internal temperature was increased to 200° C. over 1 hour. In this case, the temperature of the rectifying column outlet was controlled to 110° C. or less by cooling and valve opening. The mixed vapor of distilled-off p-DCB and water was condensed by the condenser and separated by the decanter, and then p-DCB was returned to the autoclave. The amount of water distilled off was 0.228 parts by mass (12.7 parts by mole).

[Step 3]

At the start of step 3, the amount of water in the autoclave was 0.041 parts by mass (2.3 parts by mole) corresponding to 0.005 moles per mole of NMP charged in step 2 and 0.010 moles per mole of sulfur atoms present in the autoclave. The amount of SMAB present in the autoclave was the same as in Step 1, that is, 0.147 moles per mole of sulfur atoms present in the autoclave. Next, the internal temperature was increased from 200° C. to 230° C. over 3 hours, and then increased to 250° C. after stirring at 230° C. for 1 hour, followed by further stirring for 1 hour. The gauge pressure at the internal temperature of 200° C. was 0.03 MPa, and the final gauge pressure was 0.40 MPa. After cooling, 0.650 parts by mass of the resultant slurry was poured into 3 parts by mass (3 parts by liter) of water, stirred at 80° C. for 1 hour, and then filtered. The resultant cake was again stirred in 3 parts by mass (3 parts by liter) of hot water for 1 hour, washed, and then filtered. This operation was repeated four times. Then, pH was adjusted to 4.0 by again adding 3 parts by mass (3 parts by liter) hot water and acetic acid to the resultant cake, followed by stirring for 1 hour, washing, and filtration. The resultant cake was again stirred in 3 parts by mass (3 parts by liter) of hot water for 1 hour, washed, and then filtered. This operation was repeated two times. The resultant cake was dried overnight at 120° C. by using a hot-air dryer, producing a white powdery PPS resin (1).

(Production Example 2 of PPS Resin) Production of Polyphenylene Sulfide Resin (2)

In a 150-liter autoclave provided with a pressure gauge, a thermometer, a stirring blade with a condenser connected thereto, and a bottom valve, 19.413 parts by mass of flake-like sodium sulfide (60.3% by mass of $Na_2S$) and 45.000 parts by mass of NMP were charged. The resultant mixture was heated to 209° C. under stirring in a nitrogen stream to distilled off 4.644 parts by mass of water (water reaming in an amount of 1.13 moles per mole of sodium sulfide). Then, the autoclave was closed and cooled to 180° C., and 23.211 parts by mass of para-dichlorobenzene and 18.000 parts by mass of NMP were charged. The liquid temperature of 150° C. was started to be increased under a gauge pressure of 0.1 MPa using nitrogen gas. Then, reaction was allowed to proceed at a liquid temperature of 260° C. under stirring for 3 hours, and the upper portion of the autoclave was cooled by water sprinkling. Next, the temperature was lowered, and at the same time, cooling of the upper portion of the autoclave was stopped. The liquid temperature was maintained so as not to be decreased during cooling of the upper portion of the autoclave. The maximum pressure in the reaction was 0.85 MPa.

After the reaction, 0.650 parts by mass of the slurry obtained after cooling was poured into 3 parts by mass (3 parts by liter) of water, stirred at 80° C. for 1 hour, and the filtered. The resultant cake was washed by stirring in 3 parts by mass (3 parts by liter) of hot water for 1 hour and then filtered. This operation was repeated seven times. The cake was dried overnight at 120° C. by using a hot-air dryer.

Then, the cake was heat-treated at 240° C. for 3 hours by using a hot-air dryer, producing a PPS resin (2).

(Production Example 3 of PPS Resin) Production of Polyphenylene Sulfide Resin (3)

[Step 1]

In a 150-liter autoclave provided with a pressure gauge, a thermometer, a condenser, a decanter, and a stirring blade with a rectifying column connected thereto, 33.222 parts by mass (226 parts by mole) of p-dichlorobenzene (abbreviated as "p-DCB" hereinafter), 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged, and then heated to 173° C. over 5 hours under stirring in a nitrogen atmosphere, distilling off 27.300 parts by mass of water. Then, the autoclave was closed, and p-DCB distilled off by azeotrope during dehydration was separated by the decanter and appropriately returned to the autoclave. In the autoclave after the completion of dehydration, a fine-particle anhydrous sodium sulfide composition was in a state of being dispersed in p-DCB. The content of NMP in the composition was 0.079 parts by mass (0.8 parts by mole) and thus it was shown that 98% by mole (33.7 parts by mole) of NMP charged was hydrolyzed into a sodium salt (abbreviated as "SMAB" hereinafter) of NMP ring-opening compound (4-(methylamino)butyric acid). The SMAB amount in the autoclave was 0.147 parts by mole per mole of sulfur atoms present in the autoclave. When the total amount of NaSH and NaOH added was converted to anhydrous Na2S, the theoretical amount of dehydration was 27.921 parts by mass, and thus it was shown that 0.609 parts by mass (33.8 parts by mole) in the amount of 0.878 parts by mass (48.8 parts by mole) of water remaining in the autoclave was consumed by hydrolysis reaction of NMP and NaOH and is not present as water in the autoclave, and 0.269 parts by mass (14.9 parts by mole) of the residue remains in the form of water or crystal water in the autoclave. The amount of water in the autoclave was 0.065 moles per mole of sulfur atoms present in the autoclave.

[Step 2]

After the completion of the dehydration step, the internal temperature was decreased to 160° C. by cooling, and 46.343 parts by mass (467.5 parts by mole) of NMP was charged and then heated to 185° C. The amount of water in the autoclave was 0.025 moles per mole of NMP charged in step 2. When the gauge pressure reached 0.00 MPa, the valve connected to the rectifying column was opened, and the internal temperature was increased to 200° C. over 1 hour. In this case, the temperature of the rectifying column outlet was controlled to 110° C. or less by cooling and valve opening. The mixed vapor of distilled-off p-DCB and water was condensed by the condenser and separated by the decanter, and then p-DCB was returned to the autoclave. The amount of water distilled off was 0.228 parts by mass (12.7 parts by mole).

[Step 3]

At the start of step 3, the amount of water in the autoclave was 0.041 parts by mass (2.3 parts by mole) corresponding to 0.005 moles per mole of NMP charged in step 2 and 0.010 moles per mole of sulfur atoms present in the autoclave. The amount of SMAB present in the autoclave was the same as in Step 1, that is, 0.147 moles per moles of sulfur atoms present in the autoclave. Next, the internal temperature was increased from 200° C. to 230° C. over 3 hours, and then increased to 250° C. after stirring at 230° C. for 1 hour, followed by further stirring for 1 hour. The gauge pressure at the internal temperature of 200° C. was 0.03 MPa, and the final gauge pressure was 0.40 MPa. After cooling, 0.650 parts by mass of the resultant slurry cooled was poured into 3 parts by mass (3 parts by liter) of water, stirred at 80° C. for 1 hour, and then filtered. The cake was again stirred in 3 parts by mass (3 parts by liter) of hot water for 1 hour, washed, and then filtered. This operation was repeated four times. Then, 3 parts by mass (3 parts by liter) was again added to the resultant cake, and pH was adjusted to 4.0 by adding acetic acid, followed by stirring for 1 hour, washing, and filtration. The resultant cake was again stirred in 3 parts by mass (3 parts by liter) of hot water for 1 hour, washed, and then filtered. This operation was repeated two times. The resultant cake was dried overnight at 120° C. by using a hot-air dryer, producing a white powdery PPS resin (3).

(Production of Resin Composition for Producing Resin Member)

The PPS resin produced as described above was charged in a vented twin-screw extruder (TEX-2 manufactured by Japan Steel Works, Ltd.) and melt-kneaded with a resin composition shown in Table 1 and a resin component discharge amount of 30 kg/hr at a screw rotational speed of 220 rpm and a set resin temperature set to 320° C., producing pellets of a resin composition for each of examples and comparative examples. In addition, the PPS resin composition was produced by using glass fibers (fiber length: 200 μm, average diameter: 10 μm, olefinic copolymer (glycidyl methacrylate-modified ethylene copolymer elastomer (product name "Bondfast" manufactured by Sumitomo Chemical Co., Ltd.).

(Production of Resin Member)

A non-roughened metal was placed in an injection molding machine (SV-50M manufactured by Sumitomo Heavy Industries, Ltd.), and the pellets of the resin composition for each of Examples 1 to 8 and Comparative Examples 1 to 3 were injection-molded at a screw temperature of 320° C., producing a resin member having a size of length×width× thickness=45 mm×10 mm×3.0 mm.

(Production of Metal Member)

(Production of Metal Member (B-0))

A metal member (B-0) was cut into a size of length× width×thickness=45 mm×10 mm×1.5 mm from an untreated (non-roughened) plate of each of aluminum die cast (ADC12), aluminum (A5052), and copper (C1100).

(Production of Metal Member (Surface Roughening B-1))

The metal member (B-0) of ADC12 was treated with Amalpha of Mec Company, Ltd. (D process), producing a metal member (surface roughening B-1) having a roughened surface in at least a portion of the surface joined to a resin member.

(Production of Metal Member (Surface Roughening B-2))

In the metal member (B-0) of ADC12, parallel grooves were formed at a groove depth of about 150 μm and a pitch of about 200 μm by laser cutting, producing a metal member (surface roughening B-2) having a roughened surface in at least a portion of the surface joined to a resin member.
(Production of Metal Member (Surface Roughening B-3))

The metal member (B-0) of A5052 was treated with Amalpha of Mec Company, Ltd. (D process), producing a metal member (surface roughening B-3) having a roughened surface in at least a portion of the surface joined to a resin member.
(Production of Metal Member (Surface Roughening B-4))

The metal member (surface roughening B-0) of C1100 was treated with Amalpha of Mec Company, Ltd. (A10201 process), producing a metal member (surface roughening B-4) having a roughened surface in at least a portion of the surface joined to a resin member.
(Production of metal-resin composite)

Examples 1 to 8 and Comparative Examples 1 to 3

As shown in FIG. 1, each of the resin members 101 was superposed on each of the metal members 102 having the roughened surface formed in at least one surface thereof so as to be in contact with the roughened surface (contact area of length×width=5 mm×10 mm). Next, a stationary-type friction spot joining apparatus (FSJ manufactured by Kawasaki Heavy Industries, Ltd.) was used, and the resin member 101 and the metal member 102 were fixed on an exclusive jig so as to be on the lower side and the upper side, respectively, as shown in FIG. 1. Then, the resin member 101 and the metal member 102 were joined together by pressing the rotating tool 201 (φ 6 mm) rotated on the surface of the metal member 102. In this case, with the rotational speed of the rotating tool set to 3000 rpm, the push-in speed set to 5 mm/s, and the push-in pressure set to 800 N, the rotating tool 201 was maintained for 1 to 2 seconds in the state of being pushed in the surface of the metal member 102. Then, the rotating tool was rotated at a rotational speed decreased to 100 rpm in a pressed state and maintained for 3.5 seconds. As a result of pressing of the rotating tool under rotation, a circular press mark of about φ5 mm was found on the surface of the metal member 102 after joining, while a distorted mark was not found on the joining surface between the resin member 101 and the metal member 102 and on the resin member 101. The joining strength and heat cycle resistance of the metal-resin composite produced in each of Examples 1 to 8 and Comparative Examples 1 to 3 and the resin physical properties were evaluated by the methods described in Measurement Examples 1 to 4, respectively. The results are shown in Table 1.

TABLE 1

| | | | Example 1 | Example 2 | Example 3 | Example 4 | Example 5 | Example 6 | Example 7 |
|---|---|---|---|---|---|---|---|---|---|
| Resin member | Resin composition | PPS resin (1) | — | 60 | 55 | — | — | 60 | 60 |
| | | PPS resin (2) | — | — | — | 55 | — | — | — |
| | | PPS resin (3) | 100 | — | — | — | 55 | — | — |
| | | PC resin | — | — | — | — | — | — | — |
| | | PA resin | — | — | — | — | — | — | — |
| | | PET resin | — | — | — | — | — | — | — |
| | | Glass fiber | — | 40 | 40 | 40 | 40 | 40 | 40 |
| | | Olefinic copolymer | — | — | 5 | 5 | 5 | — | — |
| | Resin physical properties | Tm(° C.) | 273 | 279 | 278 | 278 | 279 | 279 | 279 |
| | | ΔH(J/g) | 45 | 31 | 34 | 35 | 29 | 31 | 31 |
| | | Tc(° C.) | 194 | 233 | 231 | 238 | 230 | 233 | 233 |
| | | Tm − Tc(° C.) | 79 | 46 | 47 | 40 | 49 | 46 | 46 |
| | | Melt viscosity (Pa · s) | 372 | 2540 | 2958 | 1147 | 4672 | 2540 | 2540 |
| Metal member | Metal type | | B-1 (ADC12) | B-1 (ADC12) | B-1 (ADC12) | B-1 (ADC12) | B-1 (ADC12) | B-2 (ADC12) | B-3 (A5052) |
| Physical properties of metal-resin composition | Joining strength (MPa) | | 34 | 31 | 32 | 29 | 27 | 31 | 27 |
| | (Heat cycle resistance) | | | | | | | | |
| | Joining strength after heat cycle test (MPa) | | 24 | 28 | 32 | 26 | 26 | 29 | 22 |
| | Retention rate (%) | | 70% | 92% | 100% | 90% | 96% | 94% | 80% |

| | | | Example 8 | Comparative Example 1 | Comparative Example 2 | Comparative Example 3 |
|---|---|---|---|---|---|---|
| Resin member | Resin composition | PPS resin (1) | 60 | — | — | — |
| | | PPS resin (2) | — | — | — | — |
| | | PPS resin (3) | — | — | — | — |
| | | PC resin | — | 100 | — | — |
| | | PA resin | — | — | 100 | — |
| | | PET resin | — | — | — | 100 |
| | | Glass fiber | 40 | — | — | — |
| | | Olefinic copolymer | — | — | — | — |
| | Resin physical properties | Tm(° C.) | 279 | — | 256 | 258 |
| | | ΔH(J/g) | 31 | — | 77 | 39 |
| | | Tc(° C.) | 233 | — | 223 | 182 |

TABLE 1-continued

|  |  |  | | | | |
|---|---|---|---|---|---|---|
|  |  | Tm − Tc(° C.) | 46 | — | 34 | 76 |
|  |  | Melt viscosity (Pa · s) | 2540 | 1291 | 191 | 390 |
| Metal member | Metal type |  | B-4 (C1100) | B-1 (ADC12) | B-1 (ADC12) | B-1 (ADC12) |
| Physical properties of metal-resin composition | Joining strength (MPa) |  | 29 | 13 (Heat cycle resistance) | 18 | 20 |
|  | Joining strength after heat cycle test (MPa) |  | 25 | 7 | 11 | 13 |
|  | Retention rate (%) |  | 88% | 55% | 60% | 66% |

The results in Table 1 indicate that in Examples 1 to 8 using the PPS resin as the thermoplastic resin constituting the resin member, the joining strength between the resin member and the metal member is significantly improved. On the other hand, in Comparative Example 1 using the PC resin, which does not have a melting point and recrystallization temperature, as the thermoplastic resin constituting the resin member, and in Comparative Examples 2 and 3 using the PA resin and the PET resin, each having a lower melting point, the metal member and the resin member have low joining strength therebetween, and the heat cycle resistance also deteriorates.

In addition, a section of the joining surface between the resin member and the metal member, obtained by cutting the metal-resin composite produced in each of Examples 1 to 8, was observed with a scanning electron microscope (SEM, S-2380N model manufactured by Hitachi, Ltd.). As a result, the metal member was pushed into the resin member to be distorted by about several tens μm. In any case, the angle θ of the projection mark on the metal member to the resin member side was 6° to 10°. In addition, at the joining surface between the resin member and the metal member, the resin member was deeply securely penetrated into the roughened surface of the metal member having a surface area increased by surface roughening, and thus the joining surface between the resin member and the metal member was filled with the resin member without gaps. It can also be understood from the results of observation that in the metal-resin composite produced in each of Examples 1 to 8, the joining strength between the resin member and the metal member is significantly improved.

The invention claimed is:

1. A metal-resin composite comprising a metal member and a resin member which are joined together,
    wherein the resin member contains at least a thermoplastic resin;
    the resin member and the metal member are joined together by melting the resin member with frictional heat generated in a surface of the metal member on its side opposite to the resin member in a state where the metal member and the resin member are superposed;
    the melting point of the thermoplastic resin is 260° C. or more;
    the melt viscosity of the resin member is 1000 to 5000 Pa·s; and
    wherein a retention rate of a joining strength of the metal-resin composite after a heat cycle test is 80% or more.

2. A metal-resin composite comprising a metal member and a resin member which are joined together,
    wherein the resin member contains at least a thermoplastic resin;
    a surface of the metal member has a press mark on its side opposite to the resin member;
    the melting point of the thermoplastic resin is 260° C. or more;
    the melt viscosity of the resin member is 1000 to 5000 Pa·s; and
    wherein a retention rate of a joining strength of the metal-resin composite after a heat cycle test is 80% or more.

3. The metal-resin composite according to claim 2, wherein the press mark present on the surface of the metal member has a concave shape in a sectional view and one or two or more independent circular shape(s) in a front view.

4. The metal-resin composite according to claim 2, wherein the press mark present on the surface of the metal member has a concave shape in a sectional view and an overall straight-line shape, an overall shelf shape, an overall lattice or network shape, or an overall zigzag shape, which is formed by overlapping two or more circular press marks, in a front view.

5. The metal-resin composite according to claim 1, wherein the resin member contains 1 to 150 parts by mass of a glass fiber assuming that a total amount of the thermoplastic resin in the resin member is 100 parts by mass.

6. The metal-resin composite according to claim 1, wherein the resin member contains 0.01 to 100 parts by mass of an olefinic copolymer assuming that a total amount of the thermoplastic resin in the resin member is 100 parts by mass.

7. The metal-resin composite according to claim 2, wherein the resin member contains 1 to 150 parts by mass of a glass fiber assuming that a total amount of the thermoplastic resin in the resin member is 100 parts by mass.

8. The metal-resin composite according to claim 2, wherein the resin member contains 0.01 to 100 parts by mass of an olefinic copolymer assuming that a total amount of the thermoplastic resin in the resin member is 100 parts by mass.

9. The metal-resin composite according to claim 5, wherein the resin member contains 0.01 to 100 parts by mass of an olefinic copolymer assuming that a total amount of the thermoplastic resin in the resin member is 100 parts by mass.

10. The metal-resin composite according to claim 7, wherein the resin member contains 0.01 to 100 parts by mass of an olefinic copolymer assuming that a total amount of the thermoplastic resin in the resin member is 100 parts by mass.

11. The metal-resin composite according to claim 1, wherein a joining strength of the metal-resin composite is in a range of 27 MPa or more to 32 MPa.

12. The metal-resin composite according to claim 2, wherein a joining strength of the metal-resin composite is in a range of 27 MPa or more to 32 MPa.

13. The metal-resin composite according to claim 5, wherein a joining strength of the metal-resin composite is in a range of 27 MPa or more to 32 MPa.

* * * * *